US010399699B1

(12) United States Patent
Yang

(10) Patent No.: US 10,399,699 B1
(45) **Date of Patent: *Sep. 3, 2019**

(54) AIRCRAFT CONTROL METHOD AND APPARATUS AND AIRCRAFT

(71) Applicant: AUTEL ROBOTICS CO., LTD., Shenzhen, Guangdong (CN)

(72) Inventor: Jian Yang, Guangdong (CN)

(73) Assignee: AUTEL ROBOTICS CO., LTD., Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/400,407

(22) Filed: May 1, 2019

Related U.S. Application Data

(63) Continuation-in-part of application No. 16/243,529, filed on Jan. 9, 2019, now Pat. No. 10,341,573, which (Continued)

(30) Foreign Application Priority Data

Jul. 10, 2017 (CN) .......................... 2017 1 0557726

(51) Int. Cl.
*B64D 45/08* (2006.01)
*H04N 5/235* (2006.01)

(Continued)

(52) U.S. Cl.
CPC ............ *B64D 45/08* (2013.01); *B64C 39/024* (2013.01); *B64D 47/02* (2013.01); *B64D 47/08* (2013.01);

(Continued)

(58) Field of Classification Search
CPC ...... B64D 47/02; B64D 47/08; H04N 5/2351; H04N 5/2354

(Continued)

(56) References Cited

U.S. PATENT DOCUMENTS 9,849,981 B1 12/2017 Burgess et al.
9,854,155 B1 12/2017 Sikka et al.

(Continued)

FOREIGN PATENT DOCUMENTS

CN 102862683 A 1/2013
CN 105813346 A 7/2016

(Continued)

OTHER PUBLICATIONS

The International Search Report dated Jul. 17, 2018; PCT/CN2018/082676.

(Continued)

*Primary Examiner* — Maceeh Anwari
(74) *Attorney, Agent, or Firm* — Ladas & Parry LLP

(57) ABSTRACT

This invention discloses an aircraft control method, apparatus and an aircraft. The invention relates to the field of aircraft control technologies. The method includes: obtaining ambient luminance data by a luminance sensing apparatus of an aircraft; determining whether the ambient luminance data satisfies a luminance value required for normal running of a vision system of the aircraft; and adjusting, when the ambient luminance data does not satisfy the luminance value required for normal running of the vision system of the aircraft, a working status of a light emitting apparatus on the aircraft to change light emitting luminance of the light emitting apparatus. The foregoing aircraft control method, apparatus and the aircraft can accurately learn a flight environment in which the aircraft is located, thereby effectively implementing vision positioning on the aircraft and more conveniently controlling the aircraft.

30 Claims, 6 Drawing Sheets

Related U.S. Application Data is a continuation-in-part of application No. PCT/CN2018/082676, filed on Apr. 11, 2018.

(51) Int. Cl.

| | |
|---|---|
| ***B64D 47/08*** | (2006.01) |
| ***B64C 39/02*** | (2006.01) |
| ***B64D 47/02*** | (2006.01) |

(52) U.S. Cl.

CPC ......... *H04N 5/2351* (2013.01); *H04N 5/2354* (2013.01); *B64C 2201/18* (2013.01); *B64D 2203/00* (2013.01)

(58) Field of Classification Search

USPC ............................................................ 701/36

See application file for complete search history.

(56) References Cited

U.S. PATENT DOCUMENTS

| | | | |
|---|---|---|---|
| 9,945,828 | B1 | 4/2018 | Poling et al. |
| 9,946,256 | B1 | 4/2018 | Yui et al. |
| 10,151,965 | B2 | 12/2018 | Zhang et al. |
| 2013/0200207 | A1 | 8/2013 | Pongratz et al. |
| 2015/0158587 | A1 | 6/2015 | Patrick et al. |
| 2016/0006954 | A1 | 1/2016 | Robertson |
| 2016/0234910 | A1 | 8/2016 | Harada |
| 2016/0304198 | A1 | 10/2016 | Jourdan |
| 2017/0104939 | A1 | 4/2017 | Sun |
| 2018/0109767 | A1 | 4/2018 | Li et al. |
| 2019/0051191 | A1 | 2/2019 | Mosher et al. |
| 2019/0056498 | A1 | 2/2019 | Sonn et al. |
| 2019/0061941 | A1 | 2/2019 | Zhang et al. |

FOREIGN PATENT DOCUMENTS

| | | | |
|---|---|---|---|
| CN | 106005452 | A | 10/2016 |
| CN | 106167101 | A | 11/2016 |
| CN | 106256688 | A | 12/2016 |
| DE | 202011004750 | U1 | 10/2011 |

OTHER PUBLICATIONS

USPTO NOA mailed Apr. 2, 2019 in connection with U.S. Appl. No. 16/243,529.

AIRCRAFT CONTROL METHOD AND APPARATUS AND AIRCRAFT

This application is a continuation-in-part of U.S. patent application Ser. No. 16/243,529 filed on Jan. 9, 2019, which is a continuation-in-part of International Application No. PCT/CN2018/082676 filed on Apr. 11, 2018, which claims priority to Chinese Application No. CN201710557726.9 filed on Jul. 10, 2017, both of which are hereby incorporated by reference in their entirety.

BACKGROUND

Technical Field

The present application relates to the field of aircraft control technologies and in particular, to an aircraft control method, apparatus and an aircraft.

Related Art

An aircraft is a controllable flight device that has driving force, carries out a plurality of types of tasks and can be repeatedly used. Flight of the aircraft is controlled by using a wireless remote control device and a control apparatus of the aircraft.

Currently, the aircraft obtains information indicating a flight environment in which the aircraft is located by using a vision auxiliary apparatus (or referred to as a vision system) during a flight, thereby assisting the aircraft to implement flight operations such as precise hovering and intelligent landing and obstacle avoidance. For example, when automatically landing, the aircraft detects a ground feature by using the vision auxiliary apparatus to implement intelligent landing and obstacle avoidance of the aircraft.

However, in a low-light environment such as nighttime, light is dim, luminance of detected image data is low, and vision positioning cannot be effectively performed on the aircraft by using the vision auxiliary apparatus. Therefore, a flight environment in which the aircraft is located cannot be clearly learned, causing much inconvenience to control over the aircraft. For example, when the aircraft automatically lands, because light is dim, the surrounding environment cannot be accurately learned during landing. Consequently, the aircraft is very likely to land at an uneven position, causing damage to the aircraft due to a rollover.

SUMMARY

To resolve a technical problem that vision positioning cannot be effectively performed on an aircraft when light is low, the present invention provides an aircraft control method, apparatus and an aircraft.

According to a first aspect, an embodiment of the present invention provides an aircraft control method, including:

obtaining, by a luminance sensing apparatus of an aircraft, ambient luminance data;

determining whether the ambient luminance data satisfies a luminance value required for normal running of a vision system of the aircraft; and if not, adjusting a working status of a light emitting apparatus on the aircraft so that the vision system of the aircraft runs normally.

According to a second aspect, an embodiment of the present invention provides an aircraft control apparatus, including:

an ambient luminance data obtaining module, configured to obtain ambient luminance data by using a luminance sensing apparatus of an aircraft;

a luminance determining module, configured to determine whether the ambient luminance data satisfies a luminance value required for normal running of a vision system of the aircraft; and a working status adjustment module, configured to adjust, when the ambient luminance data does not satisfy the luminance value required for normal running of the vision system of the aircraft, a working status of a light emitting apparatus on the aircraft for normal running of the vision system of the aircraft.

According to a third aspect, an embodiment of the present invention provides an aircraft, including:

at least one processor; and a memory in communication connection with the at least one processor, where the memory stores an instruction executable by the at least one processor and the instruction is executed by the at least one processor, so that the at least one processor is enabled to perform the method according to the first aspect.

According to a fourth aspect, an embodiment of the present invention provides a computer-readable storage medium, configured to store a program, the program, when being executed, enabling an aircraft to perform the method according to the first aspect.

Further, according to a fifth aspect, an embodiment of the invention provides an aircraft, including:

a main body;

an arm connected to the main body;

a propulsion assembly disposed on the arm, wherein the propulsion assembly comprises a motor and a propeller;

a vision system disposed on the main body, wherein the vision system comprises a camera and a processor;

a flight control system disposed in the main body; and a light emitting apparatus disposed on the main body or on the arm;

where one of the flight control system and the processor of the vision system is configured to perform the method discussed above.

The technical solutions provided in the embodiments of the present invention may include the following beneficial effects:

During flight of the aircraft, the ambient luminance data is obtained by using the luminance sensing apparatus of the aircraft, the ambient luminance data indicating ambient luminance of a flight environment in which the aircraft is located. When it is determined that the ambient luminance data does not satisfy the luminance value required for normal running of the vision system of the aircraft, the working status of the light emitting apparatus on the aircraft is adjusted and the ambient luminance of the flight environment in which the aircraft is located is further adjusted, so that under the adjusted ambient luminance, the flight environment in which the aircraft is located can be clearly learned by using the vision system. In this way, vision positioning is effectively performed on the aircraft and the aircraft is more conveniently controlled.

It should be understood that the foregoing general descriptions and the following detailed descriptions are merely examples and cannot limit the present invention.

BRIEF DESCRIPTION OF THE DRAWINGS

The accompanying drawings, which are incorporated herein and constitute a part of this specification, illustrate embodiments of the present invention and, together with the specification, serve to explain the principles of the present invention.

DETAILED DESCRIPTION

Exemplary embodiments are described in detail herein and examples of the exemplary embodiments are shown in the accompanying drawings. The implementations described in the following exemplary embodiments do not represent all implementations consistent with the present invention. On the contrary, the implementations are merely examples of apparatuses and methods that are described in detail in the appended claims and that are consistent with some aspects of the present invention.

It should be noted that the term "A and/or B" in this application means at least one of A and B. That is, the term "A and/or B" should be construed as "A", or "B", or "A and B".

The present invention provides a method to solve the problem in the background when an aircraft is in a low-light environment. In an embodiment, a luminance sensing apparatus (for example, a camera) of the aircraft perceives ambient luminance of an environment. When it is determined that the aircraft is in a low-light environment, a working status of a light emitting apparatus (for example, a LED lamp) mounted on the aircraft is adjusted so that a vision system of the aircraft can run normally.

In an embodiment, based on any or a combination of the following information, a processor of the aircraft can determine whether the aircraft is in a low-light environment.

a) an exposure amount detected by the camera; or b) optical flow quality of an image captured by the camera; or c) a frame rate of an image captured by the camera; or d) luminance of an image captured by the camera; or e) ambient luminance detected by a light sensor.

If the aircraft is in a low-light environment, the vision system mounted on the aircraft does not run normally, and the ambient luminance sensed by the luminance sensing apparatus does not satisfy a luminance value required for normal running of the vision system.

It should be noted it can be determined that the aircraft is in a low-light environment or the vision system mounted on the aircraft does not run normally in another manner.

Figure 1:
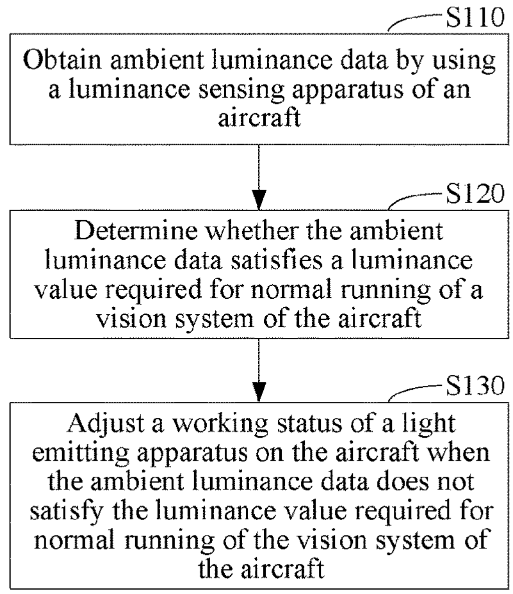
FIG. 1 is a flowchart of an aircraft control method according to an exemplary embodiment.
Figure 7:
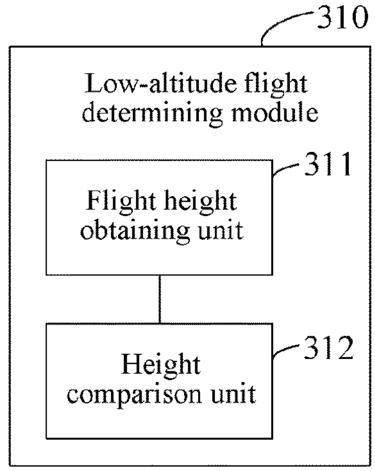
FIG. 7 is a block diagram of a low-altitude flight determining module 310 in the aircraft control apparatus according to an embodiment corresponding to FIG. 6.
Figure 8:
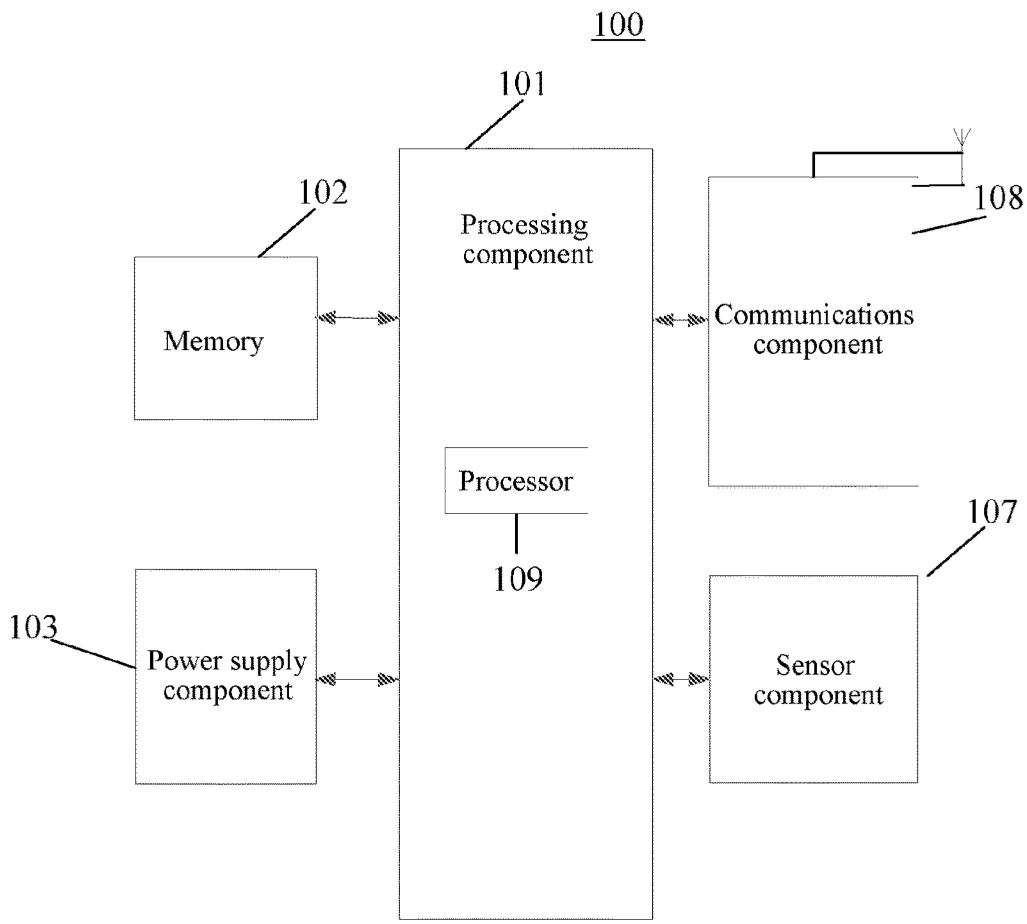
FIG. 8 is a structural block diagram of a terminal according to an exemplary embodiment.

FIG. 1 is a flowchart of an aircraft control method according to an exemplary embodiment. In an embodiment, the method indicated by FIG. 1 can be performed by a processor of the aircraft. It will be discussed in embodiments below as indicated by FIGS. 7-8. As shown in FIG. 1, the method of controlling the aircraft may include the following steps.

In step S110, ambient luminance data is obtained by using a luminance sensing apparatus of an aircraft.

The aircraft is a controllable flight device that has driving force, carries out a plurality of types of tasks and can be repeatedly used.

The aircraft is provided with the luminance sensing apparatus that assists the aircraft to learn a current flight environment, thereby implementing flight control over the aircraft.

The luminance sensing apparatus is a device performing luminance detection. The luminance sensing apparatus may be a camera or another device such as a light sensor.

The ambient luminance data may indicate ambient luminance of an environment in which the aircraft is located or ambient luminance of an environment in which a vision system on the aircraft is located.

When the aircraft is flying, ambient luminance detection is performed in the flight environment by using the luminance sensing apparatus disposed on the aircraft.

In an exemplary embodiment, during a flight, the aircraft obtains image data of the flight environment by using the camera (for example, a monocular camera, a binocular camera or a gimbal camera) disposed on the aircraft and further performs analysis processing on the image data in the camera to obtain luminance data, so as to perceive the ambient luminance of the flight environment in which the aircraft is located. For example, a processor of the aircraft receives an image from a camera, calculates a sum of a luminance value of each pixel in the image, and calculates a dimension by multiplying the length of the image by the width of the image, and then divides the sum by the dimension to get the luminance of the image. That is, the luminance of the image is obtained according to formula (1) below.

$$\text{luminance}=\text{sum}/(\text{length}*\text{width}) \quad (1)$$

In an embodiment, for example, optical flow quality or an exposure amount of an image in the camera is obtained and luminance of the image is further learned based on the optical flow quality or the exposure amount, so as to determine the ambient luminance of the flight environment in which the aircraft is located. For example, when the camera captures an image, the camera can detect the exposure amount of the image and therefore senses the ambient luminance of the environment. The exposure amount can be sent to a processor to determine whether the aircraft is in a low-light environment.

In an embodiment, the luminance sensing apparatus may be a vision system on the aircraft. The vision system includes a camera and a processor connected to the camera. The camera of the vision system includes at least one of monocular camera, binocular camera, and gimbal camera. In an embodiment, the processor may determine optical flow quality and/or an exposure amount of an image based on the image taken by the camera. In another embodiment, just as stated above, the processor receives the optical flow quality and/or the exposure amount from the camera. The optical flow quality is used for representing resolution of a texture in the image. That is, higher optical flow quality indicates higher resolution of the texture in the image; and lower optical flow quality indicates lower resolution of the texture in the image. It may also be understood as that higher optical flow quality of the image indicates a more precise distance value obtained by the vision system through calculation by using the image. If the optical flow quality of the image is excessively low, the vision system cannot perform distance calculation by using the image, that is, cannot run normally.

The exposure amount is used for representing an exposure degree of the image. It may also be understood as that, if the exposure amount is high, it indicates that external light is sufficient. The aircraft is likely to be located in a high-light environment such as a daytime outdoor environment. If the exposure amount is low, it indicates that the aircraft is in a low-light environment such as a nighttime outdoor environment. In an embodiment, the exposure amount includes at least one of an exposure time and an exposure gain. In some embodiments, one of the exposure time and the exposure gain is used as a parameter to represent the ambient luminance data. In some other embodiments, both the exposure time and the exposure gain are used as parameters to represent the ambient luminance data.

The aircraft may obtain at least one of the optical flow quality and the exposure amount from the vision system, and determine, based on the ambient luminance parameter, whether a luminance value required for normal running of the vision system of the aircraft is satisfied.

In another embodiment, the luminance sensing apparatus may be an apparatus such as a light sensor. The aircraft may obtain light data or ambient luminance data collected by the light sensor. The light data or the ambient luminance data is used for indicating intensity of ambient light. For example, a larger value of the light data or the ambient luminance data indicates stronger light of the environment in which the aircraft is located.

In step S120, it is determined whether the ambient luminance data satisfies a luminance value required for normal running of a vision system of the aircraft; and if yes, no processing is performed; or if not (N), step S130 is performed.

The vision system is a collection of hardware and software used for image collection and analysis processing in the aircraft.

When the vision system normally runs, it converts a photographed target into an image signal, then transforms information about pixel distribution, luminance and a color in the image signal into digitized signals and performs various types of calculation on these digitized signals to extract features of the target, so as to obtain information about optical flow quality or an exposure amount.

However, when the ambient luminance data indicates that the ambient luminance of the flight environment in which the aircraft is located is excessively low, the image signal obtained by the vision system has little relevance to the flight environment. Consequently, the flight environment in which the aircraft is located cannot be accurately learned. In other words, when the aircraft is in a low-light environment, the vision system of the aircraft cannot run normally and the aircraft therefore cannot learn the flight environment.

In an embodiment, when it is determined whether the ambient luminance data satisfies the luminance value required for normal running of the vision system of the aircraft, lowest flight luminance may be preset. When the ambient luminance indicated by the ambient luminance data is lower than the lowest flight luminance, it is considered that the ambient luminance data does not satisfy the luminance value required for normal running of the vision system of the aircraft. For example, a processor receives an image from a camera, and determines luminance of the image according to formula (1). If the luminance of the image is lower than a lowest flight luminance, the processor determines that the aircraft is in a low-light environment or the ambient luminance data does not satisfy the luminance value required for normal running of the vision system of the aircraft. Alternatively, when the vision system cannot accurately identify scenery information from collected image information, it is determined that the ambient luminance data does not satisfy the luminance value required for normal running of the vision system of the aircraft. Whether the ambient luminance data satisfies the luminance value required for normal running of the vision system of the aircraft may alternatively be determined in another manner.

In an embodiment, for example, lowest flight luminance is preset to be used as the luminance value required for normal running of the vision system of the aircraft. When the ambient luminance of the flight environment in which the aircraft is located is lower than the lowest flight luminance, the aircraft is in a low-light environment, and the scenery information of the flight environment in which the aircraft is located cannot be accurately learned by using the vision system of the aircraft. Consequently, vision positioning cannot be effectively performed on the aircraft. Therefore, by presetting the lowest flight luminance, when the ambient luminance is lower than the lowest flight luminance, a working status of a light emitting apparatus disposed on the aircraft is adjusted.

In another embodiment, when the luminance sensing apparatus is the vision system or a camera, the aircraft can obtain the optical flow quality and the exposure amount output by the vision system or the camera, and further determine, based on the optical flow quality and the exposure amount, whether the ambient luminance data satisfies the luminance value required for normal running of the vision system of the aircraft.

Specifically, the aircraft may first determine whether a value of the optical flow quality is less than a preset optical flow quality threshold.

The optical flow quality threshold may be determined based on optical flow quality of an image that can be processed by the vision system. If the value of the optical flow quality is less than a value, the vision system cannot process the image. For example, the vision system cannot identify a target object in the image or cannot calculate the distance by using the image. That is, the vision system cannot run normally. In this way, the value may be determined as the preset optical flow quality threshold. If the value of the optical flow quality is less than the optical flow quality threshold, it indicates that resolution of a texture of an image currently obtained by the vision system is low. And the step S130 may be then performed. However, it may be further determined whether the working status of the light emitting apparatus on the aircraft needs to be adjusted.

Optionally, if the value of the optical flow quality is less than the optical flow quality threshold, it may be further determined whether a value of the exposure amount is less than a preset exposure threshold. In an embodiment, the exposure threshold is a value of an exposure time or a value of an exposure gain. In another embodiment, the preset exposure threshold includes a value of an exposure time and a value of an exposure gain.

If the value of the exposure amount is less than the exposure threshold, it indicates that the aircraft is in a low-light state currently and the ambient luminance data does not satisfy the luminance value required for normal running of the vision system. That is, the working status of the light emitting apparatus on the aircraft needs to be adjusted and step S130 is performed. However, it should be noted that the step of comparing the value of the optical flow quality with the optical flow quality threshold can be omitted.

If the value of the exposure amount is greater than or equal to the exposure threshold, it indicates that the aircraft is not in the low-light state currently. That is, low optical flow quality is not caused because the aircraft is in a low-light environment. Therefore, the vision system needs to be adjusted in another manner to improve the optical flow quality obtained by the vision system.

It should be noted that in an embodiment, if the luminance sensing apparatus is the vision system, the aircraft determines, by using the ambient luminance data fed back by the vision system, whether the ambient luminance data satisfies the luminance value required for normal running of the vision system, that is, the luminance sensing apparatus. In such a manner, ambient luminance of an environment in which the vision system is located may be learned more accurately.

In some embodiments, the luminance sensing apparatus may detect frame rate of optical flow image. If the frame rate of the optical flow image is less than a preset frame rate threshold, it is determined that the aircraft is in a low-light environment and that the ambient luminance data fails to satisfy the luminance value required for normal running of a vision system of the aircraft.

In an embodiment, the step S120 is performed by the processor of the vision system. The processor of the vision system includes, but not limited to microprocessor, an application specific integrated circuit, or a field programmable gate array. For example, the processor of the vision system can be a vision processing chip manufactured by the company Movidius. In another embodiment, the step S120 is performed by a flight control system of the aircraft. The flight control system can be implemented as one of an application specific integrated circuit (ASIC) and a field programmable gate array (FPGA). The flight control system is configured to control the flight of the aircraft.

In step S130, when the ambient luminance data does not satisfy the luminance value required for normal running of the vision system of the aircraft, a working status of a light emitting apparatus on the aircraft is adjusted so that the vision system of the aircraft runs normally.

In an embodiment, the step of adjusting is performed by the processor of the vision system. In another embodiment, the step of adjusting is performed by the flight control system of the aircraft. The light emitting apparatus is a device that is disposed on the aircraft and that can emit light.

The light emitting apparatus may be a signal indicator on the aircraft or a lighting device such as a light emitting diode (LED) lamp or an incandescent lamp disposed on the aircraft.

In an embodiment, the light emitting apparatus is disposed on an arm of the aircraft, where the arm is connected to a main body of the aircraft. A plurality of electrical components, including at least one of a flight control system, the vision system, GPS module and battery, are disposed in or on the main body. In another embodiment, the light emitting apparatus is disposed on an upper member of the main body. In some embodiments, the light emitting apparatus is disposed on a bottom (lower member) of the main body. Certainly, in an embodiment, the light emitting apparatus may be disposed near the vision system. The vision system is connected to the main body and may be located at bottom of the main body. In other embodiment, the vision system may be located at a front side or a rear side of the main body. A position at which the light emitting apparatus is disposed on the aircraft is not limited, provided that the light emitting apparatus can adjust, on the aircraft, the ambient luminance of the environment in which the vision system is located.

When the ambient luminance data does not satisfy the luminance value required for normal running of the vision system of the aircraft, the working status of the light emitting apparatus on the aircraft needs to be adjusted and the ambient luminance of the flight environment in which the aircraft is located is further adjusted based on the luminance value required for normal running of the vision system of the aircraft, until the detected ambient luminance data satisfies the luminance value required for normal running of the vision system of the aircraft.

Optionally, when the working status of the light emitting apparatus on the aircraft is adjusted, a light emitting color of the light emitting apparatus may be changed, for example, from green to white, so as to increase the light emitting luminance of the light emitting apparatus. Alternatively, luminance of the light emitting apparatus may be directly adjusted. Alternatively, the luminance of the light emitting apparatus may be adjusted by controlling on or off of the light emitting apparatus. For example, the light emitting apparatus is enabled when the light emitting apparatus is disabled, so as to adjust the luminance of the light emitting apparatus. The working status of the light emitting apparatus on the aircraft may be further adjusted in another manner.

The ambient luminance of the flight environment in which the aircraft is located changes by adjusting the working status of the light emitting apparatus. When the ambient luminance of the flight environment in which the aircraft is located is sufficient, the flight environment in which the aircraft is located can be clearly learned for convenience of flight control over the aircraft.

For example, when it is learned by using the camera of the aircraft that the ambient luminance of the flight environment in which the aircraft is located is low, luminance of a lighting lamp disposed on the aircraft is increased, thereby increasing the ambient luminance of the flight environment in which the aircraft is located, so as to clearly learn the scenery information of the flight environment in which the aircraft is located; when it is learned by using the luminance sensing apparatus of the aircraft that the ambient luminance of the flight environment in which the aircraft is located is high, the luminance of the lighting lamp disposed on the aircraft is decreased, thereby decreasing the ambient luminance of the flight environment in which the aircraft is located, so as to reduce power consumption when it is ensured that the flight environment in which the aircraft is located can be clearly learned.

In an implementation, when the luminance sensing apparatus is the vision system including a camera, after it is determined that the ambient luminance data does not satisfy the luminance value required for normal running of the vision system of the aircraft, the working status of the light emitting apparatus on the aircraft can be adjusted based on the optical flow quality and/or the exposure amount in the ambient luminance data.

For example, the light emitting luminance of the light emitting apparatus may be adjusted based on the optical flow quality. For example, a smaller value of the optical flow quality indicates a larger degree to which the light emitting luminance is adjusted. That is, the optical flow quality is negatively correlated to the light emitting luminance.

Alternatively, the light emitting luminance of the light emitting apparatus may be adjusted based on the exposure amount. For example, a smaller value of the exposure amount indicates a larger degree to which the light emitting luminance is adjusted. That is, the exposure amount is negatively correlated to the light emitting luminance.

Alternatively, the light emitting luminance of the light emitting apparatus may be adjusted with reference to both the optical flow quality and the exposure amount. The optical flow quality and the exposure amount obtained by the vision system may be improved by adjusting the light emitting luminance, to make the vision system run normally.

Certainly, another working status of the light emitting apparatus may be adjusted based on the foregoing parameters. For example, the light emitting color of the light emitting apparatus is adjusted or on or off of the light emitting apparatus is adjusted.

Optionally, a working status of a light emitting apparatus, on the aircraft, related to the vision system may be further adjusted.

That the light emitting apparatus is related to the vision system may be that a position at which the light emitting apparatus is disposed on the aircraft is related to a position at which the vision system is disposed on the aircraft. That is, a light emitting apparatus that can affect the ambient luminance of the vision system by adjusting the working status is the light emitting apparatus related to the vision system.

For example, a light emitting apparatus is disposed on an arm of the aircraft and a vision system is located at a bottom portion of the aircraft, that is, a downward vision system. The light emitting apparatus related to the downward vision system may be a light emitting apparatus disposed on each arm of the aircraft. A light emitting apparatus related to a vision system located at a front end of the aircraft, that is, a forward vision system, may be a light emitting apparatus on a front end arm of the aircraft. A light emitting apparatus related to a vision system located at a rear end of the aircraft, that is, a backward vision system, may be a light emitting apparatus on a rear end arm of the aircraft.

Further, if there is a plurality of light emitting apparatuses related to the vision system, working statuses of some or all of the light emitting apparatuses may be adjusted to adjust the ambient luminance of the environment in which the vision system is located. In an embodiment, the at least two light emitting apparatuses may be enabled simultaneously.

Optionally, after the working status of the light emitting apparatus on the aircraft is adjusted, the aircraft may further obtain new ambient luminance data and determine whether the new ambient luminance data satisfies the luminance value required for normal running of the vision system of the aircraft. If not, the working status of the light emitting apparatus may be further adjusted until the new ambient luminance data satisfies the luminance value required for normal running of the vision system of the aircraft.

Further, after the aircraft determines that the new ambient luminance data satisfies the luminance value required for normal running of the vision system, the aircraft may further determine whether a value of the new ambient luminance data is far greater than the luminance value required for normal running of the vision system. If yes, the light emitting luminance of the light emitting apparatus may be decreased to reduce power consumption of the aircraft when an ambient luminance requirement of the vision system is met.

The ambient luminance of the flight environment in which the aircraft is located is learned by using the luminance sensing apparatus of the aircraft by using the method described above. Further, when the ambient luminance data does not satisfy the luminance value required for normal running of the vision system of the aircraft, the working status of the light emitting apparatus on the aircraft is adjusted to change the light emitting luminance of the light emitting apparatus, so as to change the ambient luminance of the flight environment in which the aircraft is located. In this way, the flight environment in which the aircraft is located is accurately learned, vision positioning on the aircraft is effectively implemented and the aircraft is controlled more conveniently.

Figure 2:
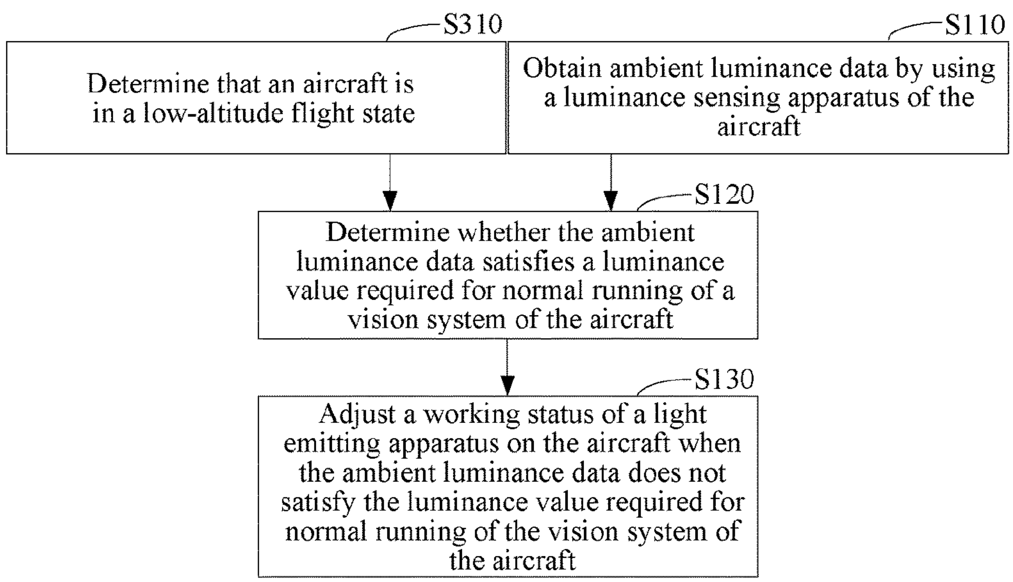
FIG. 2 is a flowchart of another aircraft control method according to an embodiment corresponding to FIG. 1.

FIG. 2 shows another aircraft control method according to an embodiment corresponding to FIG. 1. As shown in FIG. 2, before step S120, the aircraft control method may further include the following steps.

In step S310, it is determined that an aircraft is in a low-altitude flight state.

The step S310 can be performed by a processor, such as the processor of the vision system or the flight control system of the aircraft.

It should be noted that the sequence to implement this step S310 is not limited in the invention. The step S310 can be performed before the step S110 or the step S120.

The low-altitude flight state means that the aircraft flies at a low height.

There is a plurality of manners to determine that the aircraft is in the low-altitude flight state. For example, it is determined based on a flight height of the aircraft that the aircraft is in the low-altitude flight state. For another example, a detection range of an ultrasonic wave is approximately 5 meters. When a reflected ultrasonic wave can be received after the ultrasonic wave is transmitted to the ground, it is determined that the aircraft is in the low-altitude flight state. For another example, a detection range of an infrared ray is approximately 10 meters. When a reflected infrared ray can be received after the infrared ray is transmitted to the ground, it is determined that the aircraft is in the low-altitude flight state. Herein, a manner of determining that the aircraft is in the low-altitude flight state is not limited.

In the low-altitude flight state, because the flight height is low, the aircraft is very likely to collide with a building on the ground. Therefore, a flight environment in which the aircraft is located is obtained by using a vision system, so that the aircraft can avoid obstacles during a flight.

However, at night, when the aircraft is in the low-altitude flight state, luminance of an environment in which the aircraft is located is low, and thus the flight environment in which the aircraft is located cannot by accurately learned by using the vision system, leading to much inconvenience to control over the aircraft. Therefore, light emitting luminance of a light emitting apparatus is changed by adjusting a working status of the light emitting apparatus disposed on the aircraft and ambient luminance of the flight environment in which the aircraft is located is increased, so as to accurately learn scenery information of the flight environment in which the aircraft is located, effectively implement vision positioning on the aircraft and control the aircraft more conveniently.

For example, at night, when the aircraft automatically lands, the aircraft is in the low-altitude flight state. The luminance of the environment in which the aircraft is located is perceived to be low by using a camera of the aircraft. In this case, a lighting lamp disposed on an arm of the aircraft is enabled and luminance of the lighting lamp is gradually increased to increase ambient luminance until the vision system can accurately process, under the ambient luminance, image information of the flight environment in which the aircraft is located. In this way, the flight environment in which the aircraft is located can be clearly learned and the aircraft automatically lands at a safe position. Therefore, intelligent landing and obstacle avoidance of the aircraft is implemented, preventing the aircraft from landing at an uneven disadvantageous position and rolling over when the aircraft cannot accurately learn the flight environment in which the aircraft is located, causing damage to the aircraft.

For another example, in a low-altitude flight at night, the aircraft performs a hovering operation. The luminance of the environment in which the aircraft is located is perceived to be low by using the camera of the aircraft. In this case, the lighting lamp disposed on the arm of the aircraft is enabled and luminance of the lighting lamp is gradually increased to increase the ambient luminance until the vision system can accurately process, under the ambient luminance, the image information of the flight environment in which the aircraft is located. In this way, the flight environment in which the aircraft is located can be clearly learned and the aircraft automatically hovers at a safe position. Therefore, precise hovering of the aircraft is implemented, preventing the aircraft from colliding with an obstacle such as a low-altitude building when the aircraft cannot accurately learn the flight environment in which the aircraft is located during hovering, causing collision damage to the aircraft.

When the aircraft is not in the low-altitude flight state, no processing may be performed, or the lighting lamp disposed on the aircraft may be turned off and no processing is performed on a signal indicator.

When it is determined that the aircraft is not in the low-altitude flight state, the lighting lamp disposed on the aircraft is disabled regardless of whether the ambient luminance of the flight environment in which the aircraft is located is sufficient, so as to reduce power consumption of the aircraft.

When the aircraft is in a high-altitude flight state, even if under the ambient luminance of the flight environment in which the aircraft is located, the vision system cannot accurately process the image information of the flight environment in which the aircraft is located. The aircraft can be easily controlled by using a barometer, a GPS or the like. A possibility that an obstacle exists at a high altitude is low. Therefore, no impact is caused to a flight of the aircraft when the lighting lamp disposed on the aircraft is disabled.

The method described above is used to determine whether the aircraft is in the low-altitude flight state. When the aircraft is in the low-altitude flight state, luminance adjustment is performed, based on the ambient luminance, on the light emitting apparatus disposed on the aircraft, so that the ambient luminance meets a processing requirement of the vision system. Therefore, the flight environment in which the aircraft is located is accurately learned, vision positioning is effectively implemented on the aircraft and the aircraft is controlled more conveniently. When the aircraft is not in the low-altitude flight state, the lighting lamp disposed on the aircraft is disabled to reduce power consumption.

In the foregoing case, the aircraft may perform luminance adjustment for a downward vision system, or perform luminance adjustment based on a related scenario for another vision system such as a forward vision system or a backward vision system.

Figure 3:
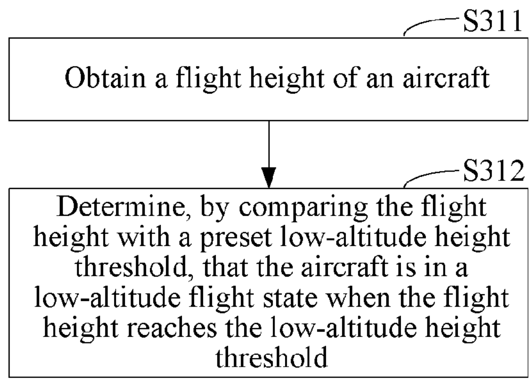
FIG. 3 is a flowchart of a specific implementation of step S310 in the aircraft control method according to an embodiment corresponding to FIG. 2.

FIG. 3 shows further detailed descriptions of step S310 in the embodiment corresponding to FIG. 2 according to an exemplary embodiment. As shown in FIG. 3, step S310 may include the following steps.

In step S311, a flight height of the aircraft is obtained.

The flight height is an altitude height or a height from the ground when the aircraft flies.

During a flight of the aircraft, the flight height of the aircraft is detected or measured by using a device such as an ultrasonic wave, a barometer or an infrared detector.

In step S312, it is determined, by comparing the flight height with a preset low-altitude height threshold, that the aircraft is in the low-altitude flight state when the flight height reaches the low-altitude height threshold.

The low-altitude height threshold is a preset height critical value of a low-altitude state and a high-altitude state.

If the flight height is less than the low-altitude height threshold, it indicates that the aircraft is in the low-altitude flight state; and if the flight height is greater than the low-altitude height threshold, it indicates that the aircraft is in a high-altitude flight state.

For example, the preset low-altitude height threshold is 10 meters. At a moment T1, an obtained flight height H1 of the aircraft is 10 meters, and then the aircraft is determined to be in the low-altitude flight state. At a moment T2, an obtained flight height H2 of the aircraft is 30 meters, and then the aircraft is determined to be in the high-altitude flight state.

In the method described above, it is determined, based on the flight height of the aircraft and the preset low-altitude height threshold, that the aircraft is in the low-altitude flight state. In addition, the working status of the light emitting apparatus disposed on the aircraft is adjusted based on ambient luminance of the aircraft, to change the light emitting luminance of the light emitting apparatus, thereby adjusting the ambient luminance of the flight environment in which the aircraft is located. In this way, under the ambient luminance, the flight environment in which the aircraft is located can be accurately learned, vision positioning is effectively implemented on the aircraft and convenience is brought to control over the aircraft.

Figure 4:
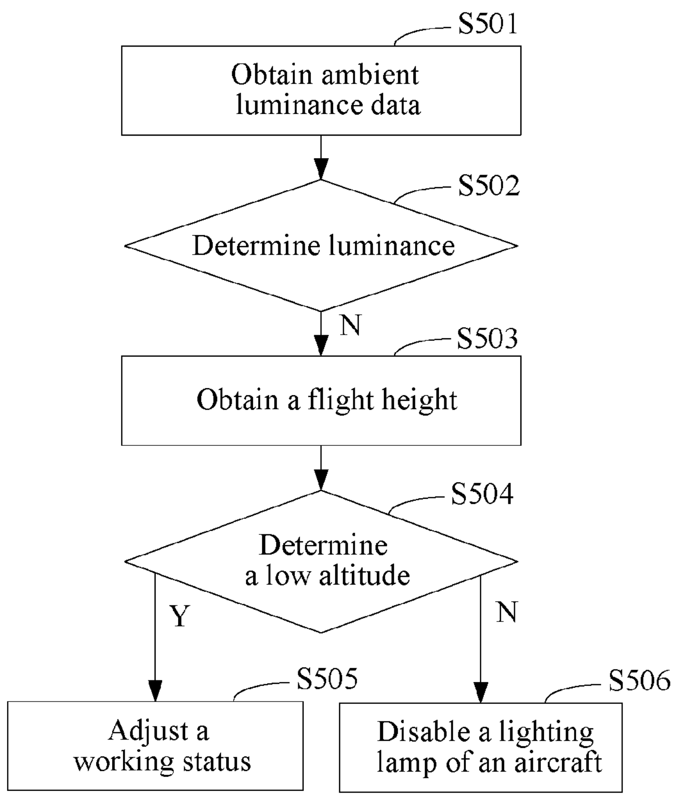
FIG. 4 is a method flowchart of specific scenario application of an aircraft control method according to an exemplary embodiment.

The foregoing method of controlling an aircraft is described in detail below with reference to a specific application scenario. The aircraft control method is operated in an aircraft. Details are shown in FIG. 4.

Step S501: Obtain ambient luminance data, that is, obtain the ambient luminance data by using a luminance sensing apparatus of the aircraft.

Step S502: Determine luminance, that is, determine whether the ambient luminance data satisfies a luminance value required for normal running of a vision system of the aircraft; and if yes (Y), perform no processing; or if not (N), perform step S503: Obtain a flight height, that is, obtain a flight height of the aircraft.

In an embodiment, the step S502 is performed by a processor of the vision system, or a flight control system, and the step S503 is performed by a flight control system or a processor of the vision system.

In an embodiment, the step 503 is performed before the step S502.

After step S503 is performed, step S504 is subsequently performed: Determine a low altitude, that is, determine whether the aircraft is in a low-altitude flight state by comparing the flight height with a preset low-altitude height threshold.

If the aircraft is in the low-altitude flight state (Y), step S505 is performed: Adjust a working status, that is, adjust a working status of a light emitting apparatus on the aircraft.

If the aircraft is not in the low-altitude flight state (N), step S506 is performed: Disable a lighting lamp of the aircraft.

Preferably, the steps S503 and S504 are performed by a same unit of the aircraft, such as the flight control system or the processer of the vision system. The step S505 and S506 are performed by the flight control system of the aircraft or the processor of the vision system of the aircraft.

The following is an apparatus embodiment of the present invention, which can be used to execute the embodiments of the foregoing aircraft control method. For details not disclosed in the apparatus embodiment of the present invention, refer to the embodiments of the aircraft control method of the present invention.

Figure 5:
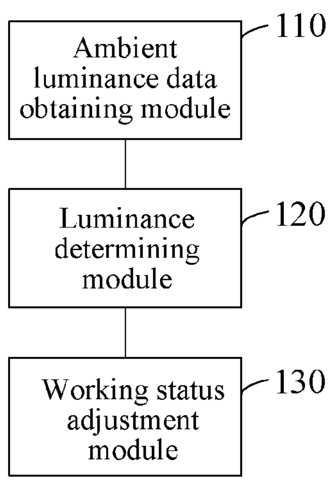
FIG. 5 is a block diagram of an aircraft control apparatus according to an exemplary embodiment.

FIG. 5 is a block diagram of a control apparatus of an aircraft according to an exemplary embodiment. The apparatus includes but is not limited to an ambient luminance data obtaining module 110, a luminance determining module 120 and a working status adjustment module 130.

The ambient luminance data obtaining module 110 is configured to obtain ambient luminance data by using a luminance sensing apparatus of an aircraft, the ambient luminance data indicating ambient luminance of a flight environment in which the aircraft is located.

The luminance determining module 120 is configured to determine whether the ambient luminance data satisfies a luminance value required for normal running of a vision system of the aircraft.

The working status adjustment module 130 is configured to adjust, when the ambient luminance data does not satisfy the luminance value required for normal running of the vision system of the aircraft, a working status of a light emitting apparatus on the aircraft.

For details of implementation processes of a function and an effect of each module in the apparatus, refer to implementation processes of corresponding steps in the foregoing aircraft control method, which is not described herein again.

Figure 6:
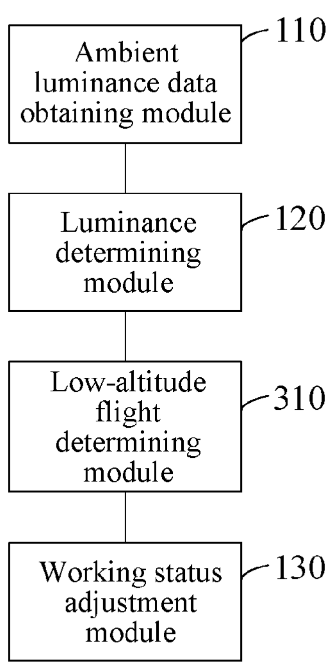
FIG. 6 is a block diagram of another aircraft control apparatus according to an embodiment corresponding to FIG. 5.

Optionally, as shown in FIG. 6, the aircraft control apparatus according to an embodiment corresponding to FIG. 5 further includes but is not limited to a low-altitude flight determining module 310.

The low-altitude flight determining module 310 is configured to determine that the aircraft is in a low-altitude flight state.

Optionally, as shown in FIG. 7, in an aircraft control apparatus according to an exemplary embodiment corresponding to FIG. 6, the low-altitude flight determining module 310 includes but is not limited to a flight height obtaining unit 311 and a height comparison unit 312.

The flight height obtaining unit 311 is configured to obtain a flight height of the aircraft.

The height comparison unit 312 is configured to determine, by comparing the flight height with a preset low-altitude height threshold, that the aircraft is in the low-altitude flight state when the flight height reaches the low-altitude height threshold.

Optionally, in the aircraft control apparatus according to the embodiment corresponding to FIG. 6, the apparatus further includes but is not limited to a lighting lamp disabling module.

The lighting lamp disabling module is configured to disable a lighting lamp disposed on the aircraft when the aircraft is not in the low-altitude flight state.

Optionally, in the aircraft control apparatus according to the embodiments corresponding to FIG. 5, FIG. 6 and FIG. 7, the working status adjustment module 130 includes one or more of a light emitting color changing unit 131, a luminance adjustment unit 132 and a light emitting apparatus on and off control unit 133.

The foregoing modules may be implemented by using software, hardware or a combination thereof configured in the aircraft. For example, in an embodiment, a processor in the aircraft, for example, a processor in a flight control system or a processor in a primary controller, implements functions of the foregoing modules by invoking a program stored in a memory.

FIG. 8 is a block diagram of a terminal 100 according to an exemplary embodiment. The terminal 100 may be the aircraft described in the foregoing embodiments and is configured to perform all or some of the steps in any of the methods shown in FIG. 1, FIG. 2, FIG. 3 and FIG. 4.

Referring to FIG. 8, the terminal 100 may include one or more of the following components: a processing component 101, a memory 102, a power supply component 103, a sensor component 107 and a communications component 108. Not all of the foregoing components are necessary. The terminal 100 may add other components or delete some components based on a function requirement of the terminal 100. This is not limited in this embodiment.

The processing component 101 usually controls an overall operation of the terminal 100, for example, an operation associated with flight control, data communication, a camera operation and a recording operation. The processing component 101 may include one or more processors 109 to execute an instruction to complete all or some steps of the foregoing operation. In addition, the processing component 101 may include one or more modules, for convenience of interaction between the processing component 101 and another component.

The memory 102 is configured to store various types of data to support an operation of the terminal 100. An example of the data includes an instruction that is of any application program or method and that is used for being operated on the terminal 100. The memory 102 may be implemented by using a volatile or non-volatile storage device of any type or a combination of volatile and non-volatile storage devices, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc. The memory 102 further stores one or more modules. The one or more modules are configured to be executed by the one or more processors 109 to complete all or some steps in any of the methods shown in FIG. 1, FIG. 2, FIG. 3 and FIG. 4.

The power supply component 103 supplies power to various components of the terminal 100. The power supply component 103 may include a power supply management system, one or more power supplies and other components associated with power generation, management and distribution of the terminal 100.

The sensor component 107 includes one or more sensors, configured to provide state evaluation of each aspect for the terminal 100. For example, the sensor component 107 may detect an on/off state of the terminal 100 and a relative position of the component. The sensor component 107 may further detect a position change of the terminal 100 or a component of the terminal 100 and a luminance change of the terminal 100. In some embodiments, the sensor component 107 may further include a magnetic sensor, a pressure sensor or a light sensor.

The communications component 108 is configured for convenience of wired or wireless communication between the terminal 100 and another device. The terminal 100 may access a communications standard-based wireless network such as Wireless Fidelity (WiFi), 2G, 3G, or a combination thereof. In an exemplary embodiment, the communications component 108 receives a broadcast signal or broadcast-related information from an external broadcast management system by using a broadcast channel. In an exemplary embodiment, the communications component 108 further includes a Near Field Communication (NFC) module for facilitating short-range communication. For example, the NFC module may be implemented based on a radio frequency identification (RFID) technology, an Infrared Data Association (IrDA) technology, an ultra-wideband (UWB) technology, a Bluetooth (BT) technology and another technology.

In an exemplary embodiment, the terminal 100 may be implemented by one or more application-specific integrated circuits (ASIC), digital signal processors (DSP), programmable logic devices (PLD), field-programmable gate arrays (FPGA), controllers, microcontrollers, microprocessors or other electronic elements, to perform the foregoing method.

A specific manner of performing an operation by the processor of the terminal in this embodiment is described in detail in the embodiments related to the aircraft control method, which is not described in detail herein again.

Optionally, the present invention further provides an aircraft to perform all or some steps of any of the aircraft control methods shown in FIG. 1, FIG. 2, FIG. 3 and FIG. 4. The aircraft includes:

at least one processor; and a memory in communication connection with the at least one processor, where the memory stores an instruction executable by the at least one processor and the instruction is executed by the at least one processor, so that the at least one processor is enabled to perform the aircraft control method according to any of the foregoing exemplary embodiments.

It should be noted that as disclosed in the above methods, the aircraft also includes a sensor configured to detect a flight height of the aircraft and a luminance sensing apparatus, such as a camera or a vision system. Please refer to the disclosure in the above methods for details.

In an exemplary embodiment, a storage medium is further provided. The storage medium is a computer-readable storage medium. For example, the storage medium may be a transitory or non-transitory computer-readable storage medium including an instruction.

The storage medium may be, for example, a memory 102 including an instruction. The instruction may be executed by the processor 109 of the terminal 100 to complete the foregoing aircraft control method.

Figure 9:
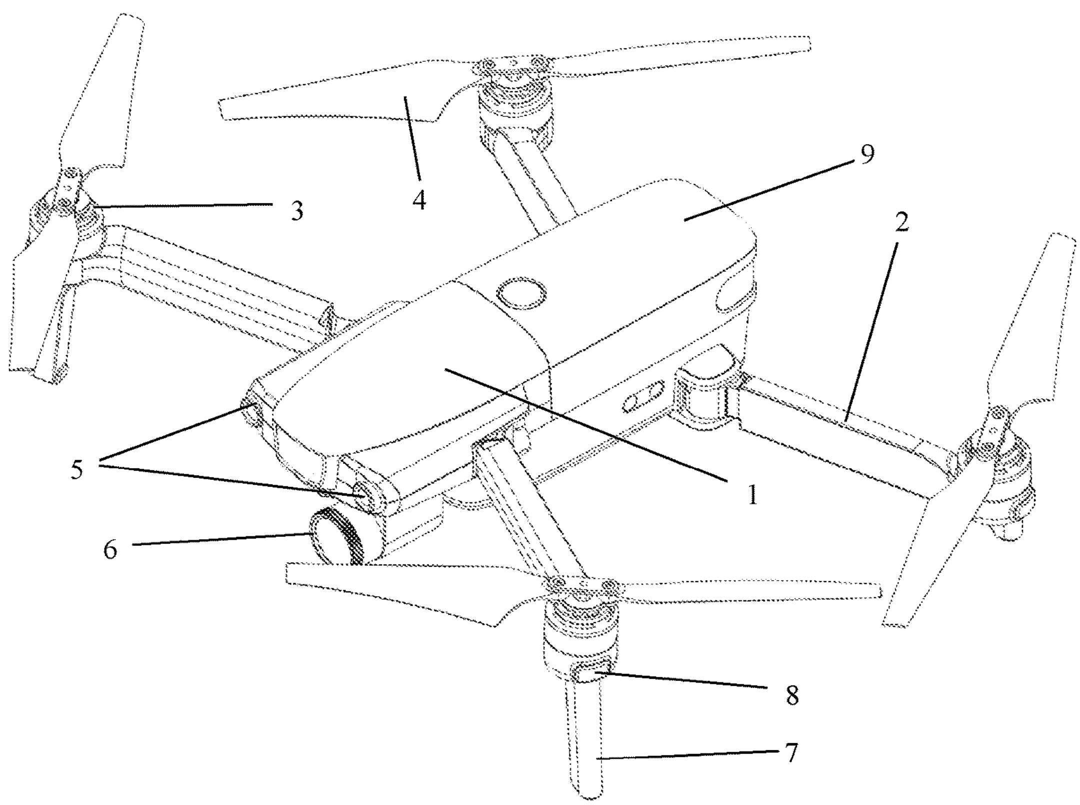
FIG. 9 is a schematic view of an unmanned aerial vehicle to implement the method described in any of FIGS. 1-4.
Figure 10:
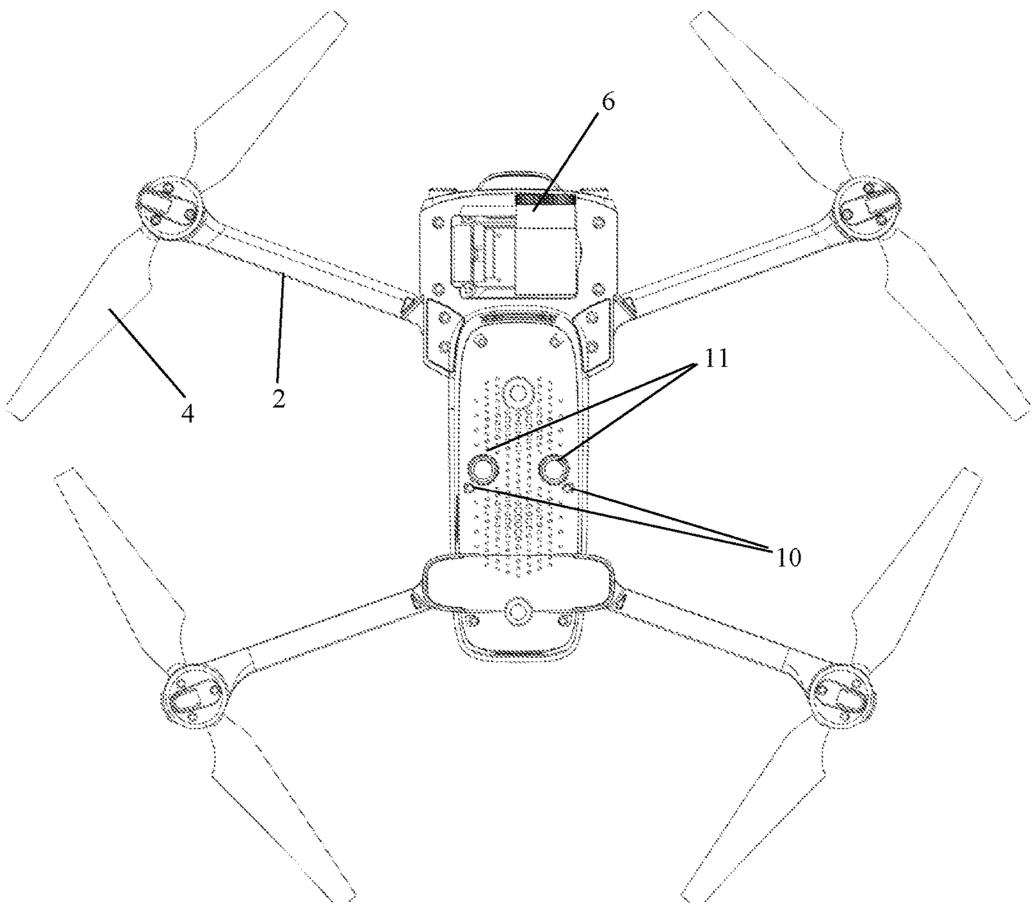
FIG. 10 is another schematic view of the unmanned aerial vehicle shown in FIG. 9.

FIGS. 9-10 disclose an aircraft to implement the above method. The aircraft includes a main body 1, a battery 9 accommodated in the main body 1. The aircraft also includes a plurality of arms 2, where each arm 2 is connected to the main body 1. A propulsion assembly is disposed on each arm 2, where the propulsion assembly includes a motor 3 and a propeller 4. The motor 3 is installed on a distal end of the arm 2, and the propeller 4 is fixedly connected to the shaft of the motor 3 so that the motor 3 drives the propeller 4 to rotate in clockwise or counterclockwise direction.

The aircraft also includes a forward camera 5 installed at the front of the main body 1. The camera 5 is configured to capture an image of an area in front of the aircraft. In an embodiment of the invention, the camera 5 is a binocular camera which includes two cameras. In another embodiment, the camera 5 is a monocular camera.

The aircraft includes a gimbal camera 6, where the camera 6 is connected to the bottom (lower member) of the main body 1. The gimbal camera 6 is configured to capture an image of an object in which a user is interested. Alternatively, the gimbal camera 6 is remotely controlled by a remote controller.

In an embodiment, the aircraft includes a landing gear 7. The landing gear can be connected to a lower portion of the main body 1 or a lower portion of the arm 2. For example, as shown in FIG. 9, the gear 7 is connected to the lower portion of the distal end of the arm 2 and installed under the motor 3. The aircraft includes at least two gears 7. In some embodiments, some or all of the gears 7 are foldable.

An indicator 8 is installed on the aircraft. In an embodiment, the indicator 8 is installed on a distal end of the arm 2, as shown in FIG. 9. In another embodiment, the indicator can be installed on the gear 7 or on the main body 1. The indicator can be a LED lamp.

A downward camera 10 is disposed at bottom of the main body 1. The camera 10 is configured to capture an image of an area under of the aircraft. In an embodiment, the camera 10 is a binocular camera which includes two cameras. In another embodiment, the camera 10 is a monocular camera.

Furthermore, the aircraft includes a light emitting apparatus 11. In an embodiment, the light emitting apparatus 11 is disposed at a lower portion or an upper portion of the main body 1. For example, as shown in FIG. 10, the light emitting apparatus 11 is disposed on the lower portion of the main body 1. In another embodiment, the light emitting apparatus 11 is disposed on the front side or rear side of the main body 1. In some other embodiments, the light emitting apparatus 11 is disposed on the arm 2. The number of the light emitting apparatus is not limited in the invention. The aircraft can includes one or more light emitting apparatus. For example, as shown in FIG. 10, the aircraft includes two light emitting apparatuses 11. In an embodiment, the light emitting apparatus 11 includes at least one of a signal indicator, a LED lamp, and an incandescent lamp.

In an embodiment, a vision system is provided on the aircraft. The vision system includes a processor and at least one camera, wherein the processor is disposed within the main body 1 and the camera of the vision system is disposed on the main body 1 or on the arm 2. For example, the aircraft includes a forward vision system, a backward vision system, and a downward vision system. The forward vision system includes a process and the camera 5. The backward vision system includes a processor and a camera which is installed at the rear end of the main body 1. The downward vision system includes a processor and the camera 10. Optionally, the aircraft includes a vision system comprising a processor and the gimbal camera 6. The processor of the vision system is configured to perform the step S110 of the method discussed above.

Furthermore, the aircraft includes a flight control system (not shown in the Figures). The flight control system is disposed within the main body 1. The flight control system is configured to control the flight of the aircraft. The flight control system can be implemented as an ASIC or a FPGA.

In an embodiment, the flight control system is configured to perform the steps S310, S120 and S130 of the method as discussed above. In another embodiment, the steps S310, S120 and S130 of the above method are performed by the processor of the vision system. In some other embodiments, some of the steps S310, S120 and S130 are performed by the flight control system and the remaining step(s) is (are) performed by the processor of the vision system.

It should be understood that the present invention is not limited to the precise structures described above and shown in the accompanying drawings and various modifications and changes can be made by a person skilled in the art without departing from the scope of the present invention. The scope of the present invention is limited only by the appended claims.

What is claimed is:

1. An aircraft, comprising:

a camera;

a sensor configured to detect a flight height of the aircraft;

a light emitting apparatus; and a processor configured to:

obtain ambient luminance data by using the camera, wherein the ambient luminance data indicates ambient luminance of an environment;

determine whether the flight height is less than a preset low-altitude height threshold;

determine whether the aircraft is in a low-light environment based on the ambient luminance data; and adjust a working status of the light emitting apparatus based on a determination that the flight height is less than the preset low-altitude height threshold and that the aircraft is in the low-light environment.

2. The aircraft according to claim 1, wherein the processor is configured to:

obtain an image captured by the camera; and obtain the ambient luminance data by analyzing the image.

3. The aircraft according to claim 1, wherein the processor is configured to:

determine whether the ambient luminance indicated by the ambient luminance data is lower than a preset lowest flight luminance; and based on a determination that the ambient luminance indicated by the ambient luminance data is lower than the preset lowest flight luminance, determine the aircraft is in the low-light environment.

4. The aircraft according to claim 1, wherein the camera is configured to detect the ambient luminance of the environment.

5. The aircraft according to claim 1, wherein the camera is configured to detect an exposure amount.

6. The aircraft according to claim 5, wherein the processor is configured to:

determine whether a value of the exposure amount is less than a preset exposure threshold; and based on a determination that the value of the exposure amount is less than the preset exposure threshold, determine that the aircraft is in the low-light environment.

7. The aircraft according to claim 1, wherein the camera comprises at least one of a monocular camera, a binocular camera, and a gimbal camera.

8. The aircraft according to claim 1, wherein the camera is located at a bottom portion of the aircraft.

9. The aircraft according to claim 1, wherein the sensor comprises at least one of a barometer, an ultrasonic sensor, and an infrared sensor.

10. The aircraft according to claim 1, wherein the preset low-altitude height threshold is 5 meters or approximately 5 meters; or wherein the preset low-altitude height threshold is 10 meters or approximately 10 meters.

11. The aircraft according to claim 1, wherein the aircraft comprises a plurality of the light emitting apparatuses;

wherein the processor is configured to adjust a working status of some or all of the light emitting apparatuses.

12. The aircraft according to claim 1, wherein the processor is specifically configured to:

control on or off of the light emitting apparatus; or adjust luminance of the light emitting apparatus; or change a light color of the light emitting apparatus.

13. The aircraft according to claim 1, wherein the processor is configured to:

determine whether a second flight height of the aircraft is greater than the preset low-altitude height threshold;

disable the light emitting apparatus based on a determination that the second flight height is greater than the preset low-altitude height threshold.

14. The aircraft according to claim 1, wherein the light emitting apparatus comprises at least one of a signal indicator, a lighting emitting diode (LED) lamp, and an incandescent lamp.

15. The aircraft according to claim 1, wherein the light emitting apparatus is disposed on an arm of the aircraft, or on a bottom of a main body of the aircraft, or near a vision system of the aircraft.

16. A method of controlling an aircraft, comprising:

obtaining ambient luminance data, wherein the ambient luminance data indicates ambient luminance of an environment;

obtaining a flight height of the aircraft;

determining whether the flight height is less than a preset low-altitude height threshold;

determining whether the aircraft is in a low-light environment based on the ambient luminance data; and based on a determination that the flight height is less than the preset low-altitude height threshold and that the aircraft is in the low-light environment, adjusting a working status of a light emitting apparatus on the aircraft.

17. The method according to claim 16, wherein the obtaining the ambient luminance data comprising:

obtaining an image captured by a camera; and obtaining the ambient luminance data by analyzing the image.

18. The method according to claim 16, wherein the determining whether the aircraft is in the low-light environment based on the ambient luminance data comprises:

determining whether the ambient luminance indicated by the ambient luminance data is lower than a preset lowest flight luminance; and based on a determination that the ambient luminance indicated by the ambient luminance data is lower than the preset lowest flight luminance, determining the aircraft is in the low-light environment.

19. The method according to claim 16, further comprising:

detecting, by a camera, the ambient luminance of the environment.

20. The method according to claim 19, wherein the camera comprises at least one of a monocular camera, a binocular camera, and a gimbal camera.

21. The method according to claim 16, wherein the ambient luminance data comprises an exposure amount.

22. The method according to claim 21, wherein the determining whether the aircraft is in the low-light environment based on the ambient luminance data comprises:

determining whether a value of the exposure amount is less than a preset exposure threshold; and based on a determination that the value of the exposure amount is less than the preset exposure threshold, determining that the aircraft is in the low-light environment.

23. The method according to claim 16, further comprising:

detecting, by a sensor, the flight height of the aircraft, wherein the sensor comprises at least one of a barometer, an ultrasonic sensor, and an infrared sensor.

24. The method according to claim 16, wherein the preset low-altitude height threshold is 5 meters or approximately 5 meters; or wherein the preset low-altitude height threshold is 10 meters or approximately 10 meters.

25. The method according to claim 16, wherein the aircraft comprises a plurality of the light emitting apparatuses;

wherein the adjusting the working status of the light emitting apparatus on the aircraft comprises:

adjusting a working status of some or all of the light emitting apparatuses.

26. The method according to claim 16, wherein the adjusting the working status of the light emitting apparatus on the aircraft comprises:

controlling on or off of the light emitting apparatus; or adjusting luminance of the light emitting apparatus; or changing a light color of the light emitting apparatus.

27. The method according to claim 16, further comprising:

obtaining a second flight height of the aircraft;

determining whether the second flight height of the aircraft is greater than the preset low-altitude height threshold; and disabling the light emitting apparatus based on a determination that the second flight height is greater than the preset low-altitude height threshold.

28. The method according to claim 16, wherein the light emitting apparatus comprises at least one of a signal indicator, a lighting emitting diode (LED) lamp, and an incandescent lamp.

29. The method according to claim 16, wherein the light emitting apparatus is disposed on an arm of the aircraft, or on a bottom of a main body of the aircraft, or near a vision system of the aircraft.

30. The method according to claim 16, wherein the adjusting the working status of the light emitting apparatus on the aircraft comprises:

adjusting the working status of the light emitting apparatus that is related to a vision system, wherein the vision system comprises a camera;

wherein the vision system is at least one of a downward vision system, a forward vision system and a backward vision system.

* * * * *